Nov. 9, 1937.  W. P. McGAHA  2,098,630
SELF-ALIGNING SAND ROLLER BEARING
Filed June 29, 1936  3 Sheets-Sheet 1
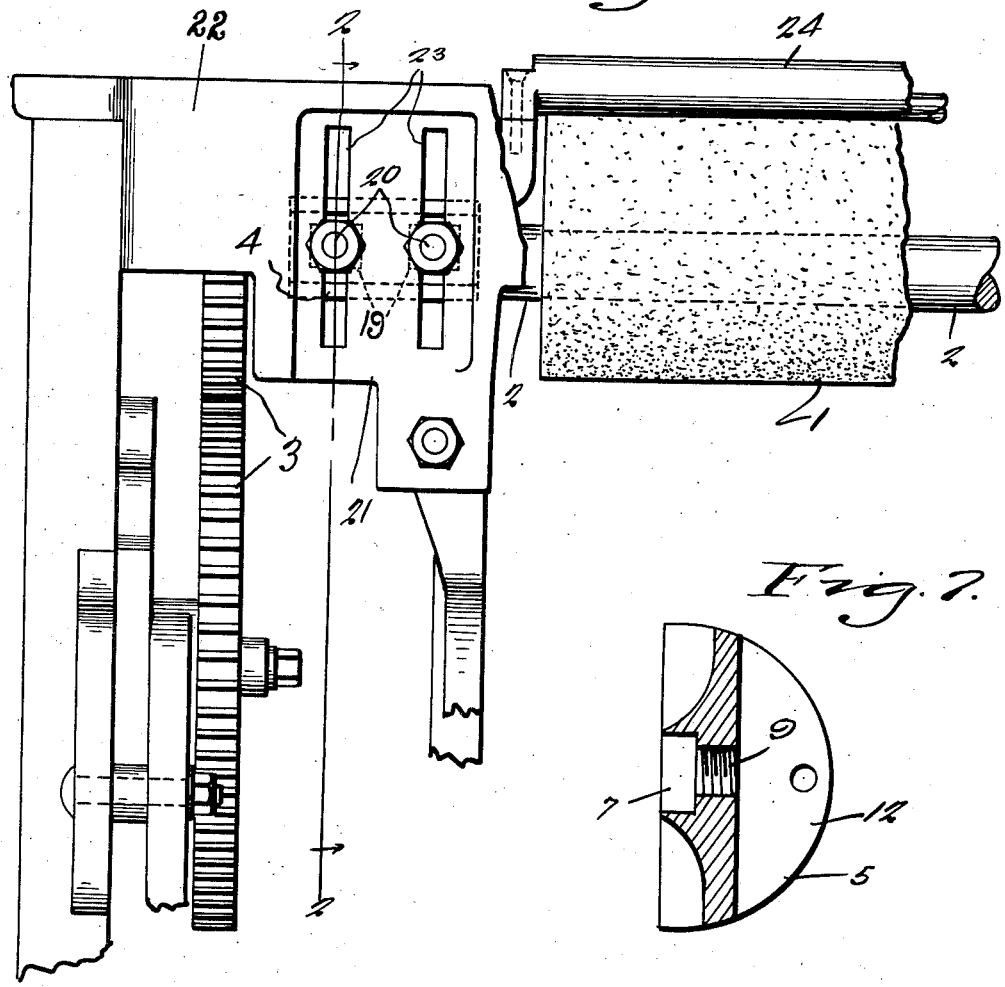
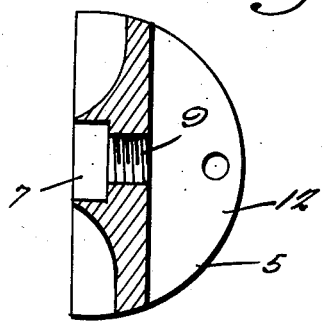
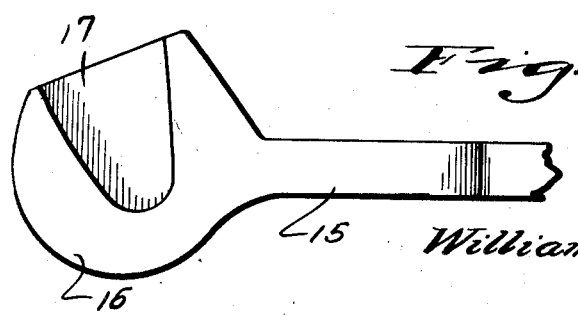
Inventor
William P. McGaha
By Clarence A. O'Brien
Attorney

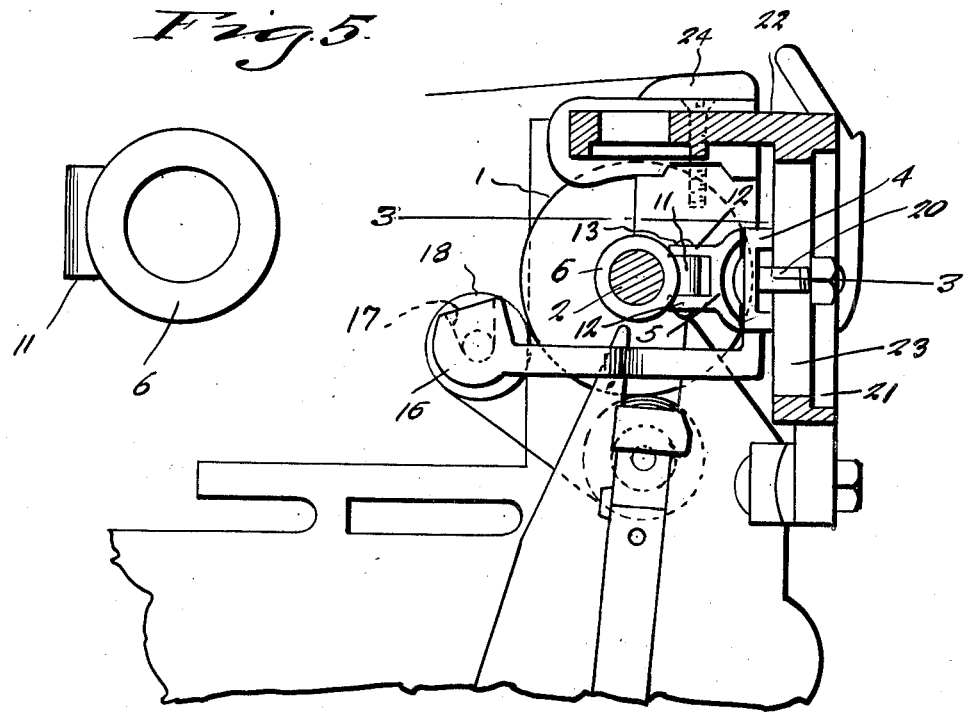
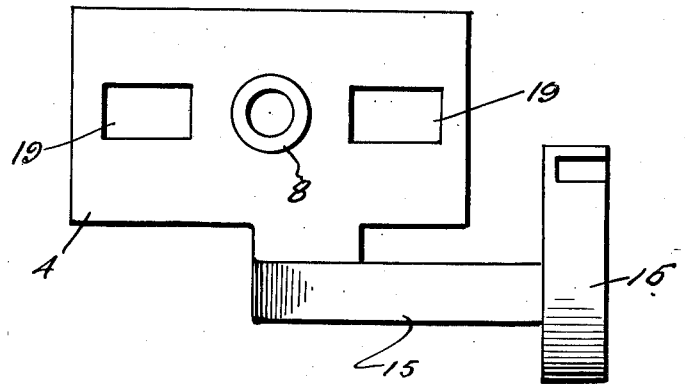

Nov. 9, 1937. W. P. McGAHA 2,098,630
SELF-ALIGNING SAND ROLLER BEARING
Filed June 29, 1936 3 Sheets-Sheet 3
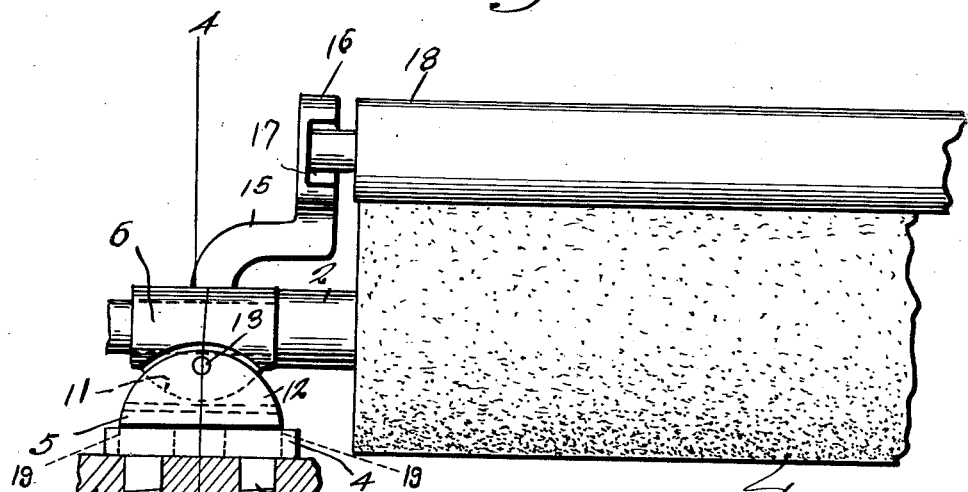
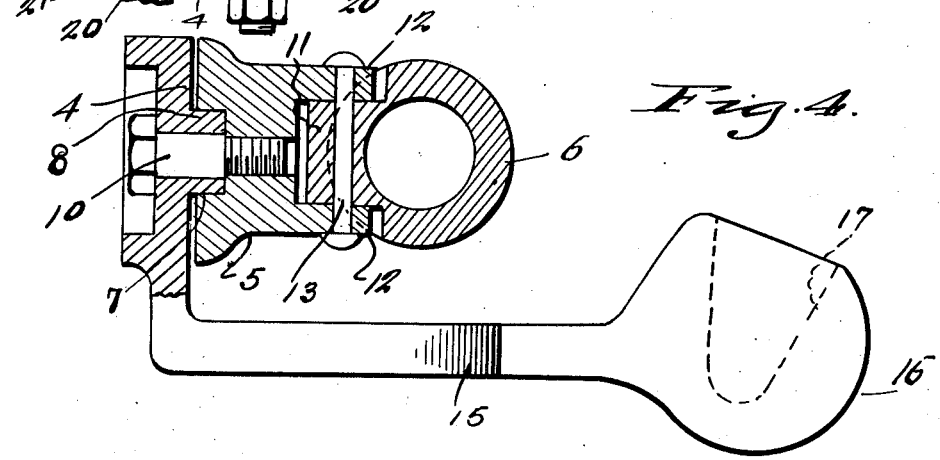
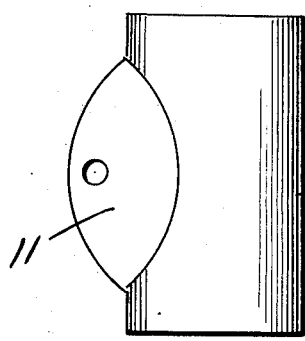
Inventor
William P. McGaha
By Clarence A. O'Brien
Attorney Patented Nov. 9, 1937

2,098,630

UNITED STATES PATENT OFFICE 2,098,630

SELF-ALIGNING SAND ROLLER BEARING

William P. McGaha, Greenville, S. C., assignor of one-half to J. W. Sanders, Greenville, S. C.

Application June 29, 1936, Serial No. 88,037

2 Claims. (Cl. 308—15)

This invention relates to a self-aligning sand roller bearings for looms, the general object of the invention being to provide a bearing composed of a number of parts pivotally connected together so that the shaft will have a certain amount of play without injuring the bearing.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a partial front elevation of a loom provided with my invention.

Figure 2 is a section on the line 2—2 of Figure 1.

Figure 3 is a section on the line 3—3 of Figure 2.

Figure 4 is a section on the line 4—4 of Figure 3.

Figure 5 is that part of the bearing which fits over an end of the shaft.

Figure 6 is a view of the base part of the bearing.

Figure 7 is a view of the intermediate part of the bearing, this view being a section.

Figure 8 is a view of that portion of the base part which forms a bearing for the cloth guide.

Figure 9 is a plan view of the bearing sleeve.

In these drawings the numeral 1 indicates the sand or take up roller, the shaft of which is shown at 2, said roller being rotated in the usual manner through means of the gearing 3.

My invention resides in the bearing for each end of the shaft of the roller 1 and each bearing comprises a base part 4, an intermediate part 5 and the bearing proper 6. The member 5 has a cylindrical recess 7 therein for receiving the cylindrical stud 8 of the member 4 and a threaded opening 9 for receiving the threaded end of a bolt 10 which connects the member 5 to the part 4, it being seen that the connection between the two parts is a swivel one.

The part 6 receives the end of the shaft of the roller 1 and has a perforated ear 11 extending from a side portion thereof which fits between the ears 12 of the member 5 and a pin 13 passes through the ears 12 and through the ear 11 and rockably connects the part 6 to the part 5.

The base part 4 is provided with an arm 15 which has a head 16 at its free end formed with a substantially triangular-shaped recess 17 which receives an end of the cloth guide 18 as shown in Figures 2 and 3.

The base part 4 is also provided with the pair of slots 19 for receiving the heads of the bolts 20 which connect the base part to the downturned ends 21 of the breast beam 22 of the loom the bolts passing through slots 23 in each part 21. The usual cloth support is shown at 24.

Thus it will be seen that the part 5 of the bearing assembly can oscillate on the base part 4 and the part 6 can rock on the pin 13 so that the bearing member will permit play of the sand roller 1 and thus eliminate damage to the bearings which happens when the bearings of the sand roller are rigid.

It is thought from the foregoing description that the advantages and novel features of the invention will be readily apparent.

It is to be understood that changes may be made in the construction and in the combination and arrangement of the several parts provided that such changes fall within the scope of the appended claims.

What is claimed is:—

1. A supporting bracket for sand rolls of a loom comprising a base plate having slotted openings for adjustably securing the plate to the breast beam of the loom, a hollow cylindrical boss projecting from one surface of the plate providing a swivel support for mounting a bearing bracket on said plate and a roller supporting arm extending from said plate, said roller supporting arm being adapted to support a guide roller and said bearing bracket being adapted to support a sand roll in cooperating engagement with the guide roller.

2. A bearing sleeve support for sand rolls of a loom comprising a base plate, means for adjustably securing the plate to the breast beam of a loom, a hollow cylindrical boss projecting from one surface of the plate, a bracket member having a recess swivelly receiving said boss, attaching means extending axially through the boss and connected to the bracket member and a bearing sleeve pivotally connected to said bracket member.

WILLIAM P. McGAHA.